United States Patent
Jiang (10) Patent No.: US 11,482,242 B2
(45) Date of Patent: Oct. 25, 2022

(54) AUDIO RECOGNITION METHOD, DEVICE AND SERVER

(71) Applicant: BEIJING DAJIA INTERNET INFORMATION TECHNOLOGY CO., LTD., Beijing (CN)

(72) Inventor: Tao Jiang, Beijing (CN)

(73) Assignee: Beijing Dajia Internet Information Technology Co., Ltd., Beijing (CN)

(*) Notice: Subject to any disclaimer, the term of this patent is extended or adjusted under 35 U.S.C. 154(b) by 160 days.

(21) Appl. No.: 16/757,273

(22) PCT Filed: Oct. 17, 2018

(86) PCT No.: PCT/CN2018/110598
§ 371 (c)(1),
(2) Date: Apr. 17, 2020

(87) PCT Pub. No.: WO2019/076313
PCT Pub. Date: Apr. 25, 2019

(65) Prior Publication Data
US 2021/0193167 A1   Jun. 24, 2021

(30) Foreign Application Priority Data
Oct. 18, 2017 (CN) .................. 201710968754.X (51) Int. Cl.
*G10L 25/51* (2013.01)
*G06F 40/58* (2020.01)
(Continued)

(52) U.S. Cl.
CPC .............. *G10L 25/51* (2013.01); *G06F 40/58* (2020.01); *G10L 15/005* (2013.01); *G10L 25/27* (2013.01)

(58) Field of Classification Search
CPC ....... G10L 25/51; G10L 15/005; G10L 25/27; G10L 25/54; G10L 15/02; G10L 15/063;
(Continued)

(56) References Cited

U.S. PATENT DOCUMENTS 6,112,021 A * 8/2000 Brand .................. G10L 15/142
703/2
6,988,201 B1 * 1/2006 Xu ........................ G06Q 20/401
705/75

(Continued)

FOREIGN PATENT DOCUMENTS

CN    102314875 A    1/2012
CN    102760434 A    10/2012
(Continued)

OTHER PUBLICATIONS

International Search Report for International Application No. PCT/CN2018/110598 dated Jan. 16, 2019.

*Primary Examiner* — Fariba Sirjani
(74) *Attorney, Agent, or Firm* — Meunier Carlin & Curfman LLC (57) ABSTRACT

An audio recognition method, including: acquiring an audio file to be recognized (S100); extracting audio feature information of the audio file to be recognized, the audio feature information including audio fingerprints (S200); searching, in a fingerprint index database, audio attribute information matched with the audio feature information, the fingerprint index database including an audio fingerprint set in which invalid audio fingerprint removal has been performed on audio sample data (S300). As the audio fingerprint set in the fingerprint index database has been subjected to invalid audio fingerprint removal of audio sample data, the storage space of audio fingerprints in the fingerprint index database can be reduced, and the audio recognition efficiency can be (Continued)

improved. Further provided are an audio recognition device and a server.

11 Claims, 2 Drawing Sheets

(51) Int. Cl.
*G10L 15/00* (2013.01)
*G10L 25/27* (2013.01)

(58) Field of Classification Search
CPC ......... G10L 15/08; G10L 15/26; G06F 40/58; G10H 1/00
See application file for complete search history.

(56) References Cited

U.S. PATENT DOCUMENTS

| | | | | |
|---|---|---|---|---|
| 8,700,194 B2* | 4/2014 | Bauer | ................... | G10L 19/018 704/205 |
| 9,519,870 B2* | 12/2016 | Sarikaya | ................. | G06N 20/00 |
| 2002/0184505 A1* | 12/2002 | Mihcak | ................ | G10H 1/0058 713/180 |
| 2003/0236661 A1* | 12/2003 | Burges | ................. | G06K 9/6232 704/205 |
| 2005/0091275 A1* | 4/2005 | Burges | .................... | G06F 16/40 |
| 2007/0162761 A1* | 7/2007 | Davis | .................... | G06F 16/683 713/182 |
| 2009/0083841 A1* | 3/2009 | Gierach | .............. | H04L 63/0861 726/7 |
| 2010/0095350 A1* | 4/2010 | Lazar | ...................... | G06F 21/36 726/3 |
| 2013/0085825 A1* | 4/2013 | Davis | ................. | H04N 21/2541 705/14.7 |
| 2013/0279740 A1* | 10/2013 | Bauer | .................. | G06F 16/285 382/100 |
| 2014/0142958 A1* | 5/2014 | Sharma | .................. | G10L 19/02 704/500 |
| 2015/0030165 A1* | 1/2015 | Risberg | ................... | H04R 5/04 381/58 |
| 2016/0063611 A1* | 3/2016 | Davis | ................. | G06Q 30/0639 705/26.63 |
| 2016/0301972 A1* | 10/2016 | Liu | ......................... | H04L 67/02 |
| 2017/0060882 A1* | 3/2017 | Steinman | .............. | G06F 16/258 |
| 2018/0042174 A1* | 2/2018 | Li | ........................ | A01D 41/127 |
| 2018/0122398 A1* | 5/2018 | Sporer | ..................... | G06F 16/60 |
| 2018/0204576 A1* | 7/2018 | Dhoot | .................... | G10L 17/00 |
| 2021/0193167 A1* | 6/2021 | Jiang | ...................... | G10L 25/27 |

FOREIGN PATENT DOCUMENTS

| | | |
|---|---|---|
| CN | 103995890 A | 8/2014 |
| CN | 104464726 A | 3/2015 |
| CN | 104679847 A | 6/2015 |
| CN | 107731220 A | 2/2018 |

\* cited by examiner

AUDIO RECOGNITION METHOD, DEVICE AND SERVER

The present application is a US National Stage of International Application No. PCT/CN2018/110598, filed on Oct. 17, 2018, which claims priority of a Chinese Patent Application No. 201710968754.X filed in the Chinese Patent Office on Oct. 18, 2017 with the title "AUDIO RECOGNITION METHOD, DEVICE AND SERVER", the entire contents of which are incorporated herein by reference.

FIELD

The present application relates to the technical field of audio recognition, and in particular, the present application relates to an audio recognition method, a device and a server.

BACKGROUND

In the field of audio recognition, an audio attribute can be determined based on audio fingerprints, such as determining the music style of a piece of music and which animal calls appear in a sound. In an audio retrieval system based on audio fingerprints, an audio fingerprint in each audio file is composed of local maximum points, that is, peak points in a frequency domain. Many times in order to achieve some effects, such as reducing volume and increasing artistic effects, some audio providers need to perform special processing on audio files before providing them to users. Since the special processing is reprocessing of the audio files, it can be understood as audio attacks. Common audio attacks include segmentation, conversion of audio encoding formats, dubbing, sampling rate conversion, and so on.

However, traditional audio retrieval systems usually store corresponding audio fingerprints based on an original audio file before an audio attack. When subjected to this type of audio attack, some of the original local maximum points in the original audio file will disappear or move to adjacent spaces in a frequency domain space, resulting that the audio fingerprints derived from the local maximum points become invalid fingerprints. The existence of invalid fingerprints not only wastes a lot of storage space, but also leads to a significant increase in the amount of calculations when matching fingerprints, and results in low recognition efficiency.

SUMMARY

The present application aims to solve at least one of the above technical defects, especially the technical defect of wasting storage space.

The present application provides an audio recognition method, including:

acquiring an audio file to be recognized;

extracting audio feature information of the audio file to be recognized, where the audio feature information includes audio fingerprints; and searching audio attribute information matched with the audio feature information, in a fingerprint index database;

where, the fingerprint index database includes an audio fingerprint set in which invalid audio fingerprints have been removed from audio sample data.

In one embodiment, the fingerprint index database includes the audio fingerprint set in which invalid audio fingerprints have been removed from the audio sample data by a classifier.

In one embodiment, the classifier is established through following operations:

extracting feature point data of audio data in a training data set as first feature point data;

performing an audio attack on the audio data in the training data set, and extracting feature point data of audio data in the training data set after performing the audio attack as second feature point data;

comparing the first feature point data with the second feature point data, marking disappeared or moved feature point data as counter-example data, and marking feature point data with robustness as positive example data; and training and establishing the classifier by using the first feature point data, the positive example data, and the counter-example data.

In one embodiment, the classifier filters the audio sample data, and removes feature point data, determined as counter-example data, as invalid audio fingerprints.

In one embodiment, the classifier filters the audio sample data, and removes feature point data, determined as counter-example data, as invalid audio fingerprints, including:

extracting feature point data of the audio sample data;

inputting the extracted feature point data into the classifier; and removing the feature point data, determined as counter-example data, as invalid audio fingerprints, according to a result of positive example data or counter-example data output by the classifier.

In one embodiment, an algorithm for training and establishing the classifier by using the first feature point data, the positive example data, and the counter-example includes at least one of the following:

a nearest neighbor algorithm, a support vector machine algorithm, or a neural network algorithm.

In one embodiment, feature point data includes at least one of the following:

energy of an audio frame where a local maximum point is located;

energy of a frequency where the local maximum point is located, and a ratio of energy of the frequency where the local maximum point is located to energy of the audio frame where the local maximum point is located;

a quantity of local maximum points in the audio frame;

energy of an audio frame near the audio frame where the local maximum point is located in time dimension; or energy distribution of points around a local maximum point.

In one embodiment, the audio attack includes data processing on audio file, and the data processing includes at least one of the following:

segmentation, conversion of audio encoding formats, sampling rate conversion, noising processing according to different signal-to-noise ratios and noise types, over-the-air (ova) dubbing, or non-ova, dubbing.

In one embodiment, the audio attribute information matched with the audio feature information includes at least one of the following:

a song style, a natural sound in an audio, or a language of a speaker in an audio.

In one embodiment, under a condition that the audio attribute information includes the language of the speaker in an audio, the audio attribute information further includes translated text information corresponding to the language of the speaker in the audio.

In one embodiment, the method further includes:
outputting the audio attribute information.

The present application further provides an audio recognition device, comprising:
an acquisition module, configured to acquire an audio file to be recognized;
an extraction module, configured to extract audio feature information of the audio file to be recognized, where the audio feature information includes audio fingerprints; and
a search module, configured to search audio attribute information matched with the audio feature information, in a fingerprint index database;
where, the fingerprint index database includes an audio fingerprint set in which invalid audio fingerprints have been removed from audio sample data.

In one embodiment, the fingerprint index database includes the audio fingerprint set in which invalid audio fingerprints have been removed from the audio sample data by a classifier.

In one embodiment, the classifier is established through following operations:
extracting feature point data of audio data in a training data set as first feature point data;
performing an audio attack on the audio data in the training data set, and extracting feature point data of audio data in the training data set after performing the attack as second feature point data;
comparing the first feature point data with the second feature point data, marking disappeared or moved feature point data as counter-example data, and marking feature point data with robustness as positive example data; and
training and establishing the classifier by using the first feature point data, the positive example data, and the counter-example data.

In one embodiment, the classifier filters the audio sample data, and removes feature point data, determined as counter-example data, as invalid audio fingerprints.

In one embodiment, the classifier filters the audio sample data, and removes feature point data, determined as counter-example data, as invalid audio fingerprints, including:
extracting feature point data of the audio sample data;
inputting the extracted feature point data into the classifier; and
removing the feature point data, determined as the counter-example data, as the invalid audio fingerprints, according to a result of positive example data or counter-example data output by the classifier.

In one embodiment, an algorithm for training and establishing the classifier by using the first feature point data, the positive example data, and the counter-example includes at least one of the following:
a nearest neighbor algorithm, a support vector machine algorithm, or a neural network algorithm.

In one embodiment, feature point data includes at least one of the following:
energy of an audio frame where a local maximum point is located;
energy of a frequency where the local maximum point is located, and a ratio of energy of the frequency where the local maximum point is located to energy of the audio frame where the local maximum point is located;
a quantity of local maximum points in the audio frame;
energy of an audio frame near the audio frame where the local maximum point is located in time dimension; or
energy distribution of points around a local maximum point.

In one embodiment, the audio attack includes data processing on audio file, and the data processing includes at least one of the following:
segmentation, conversion of audio encoding formats, sampling rate conversion, noising processing according to different signal-to-noise ratios and noise types, ova dubbing, or non-ova dubbing.

In one embodiment, the audio attribute information matched with the audio feature information includes at least one of the following:
a song style, a natural sound in an audio, or a language of a speaker in an audio.

In one embodiment, under a condition that the audio attribute information includes the language of the speaker in an audio, the audio attribute information further includes translated text information corresponding to the language of the speaker in the audio.

In one embodiment, the device further includes an output module configured to output the audio attribute information.

The present application further provides a server, which includes: one or more processors;
a memory; and
one or more application programs, where the one or more application programs are stored in the memory and configured to be executed by the one or more processors to perform the audio recognition method of any one of foregoing embodiments.

The present application further provides a computer-readable storage medium, where the computer programs stored in the storage medium are executed by a processor to perform the audio recognition method of any one of foregoing embodiments.

The present application further provides an application program, where the application program is executed to perform the audio recognition method of any one of foregoing embodiments.

According to the audio recognition method and device, the server and the computer-readable storage medium, when the stored computer programs are executed by the processor and when the application program is running, the audio file to be recognized is acquired; the audio feature information of the audio file to be recognized is extracted, where the audio feature information includes the audio fingerprints; in the fingerprint index database, the audio attribute information matched with the audio feature information is searched, where, the fingerprint index database includes the audio fingerprint set in which invalid audio fingerprints have been removed from the audio sample data. Since the audio fingerprint set in the fingerprint index database is an audio fingerprint set in which the invalid audio fingerprints have been removed from the audio sample data, the storage space of the audio fingerprints in the fingerprint index database can be reduced, and the audio recognition efficiency can be improved.

Additional aspects and advantages of the present application will be described in the following description, which will become obvious from the following description or be understood through the practice of the present application.

BRIEF DESCRIPTION OF THE DRAWINGS

The above and/or additional aspects and advantages of the present application will become obvious and easily understood from the following description of embodiments with reference to the drawings.

DETAILED DESCRIPTION OF THE EMBODIMENTS

Embodiments of the present application are described in detail below, and examples of the embodiments are illustrated in the drawings, where the same or similar reference numerals are used to refer to the same or similar elements or elements having the same or similar functions all the time. The embodiments described below with reference to the drawings are illustrative, which are only used for explaining rather than limiting the present application.

Those skilled in the art will understand that the singular forms "a", "an", "the" and "said" used herein are intended to also include plural forms, unless particularly specified. It is to be further understood that the term "including" used in the description of the present application indicates the presence of a feature, entirety, step, operation, element and/or component, but does not exclude the presence or addition of one or more other features, entireties, steps, operations, elements, components, and/or groups thereof. It will be understood that when an element is referred to being "connected" or "coupled" to another element, it can be directly connected or coupled to the other element, or there can also be an intermediate element. Further, the term "connected" or "coupled" used herein can include either wireless connection or wireless coupling. The term "and/or" used herein includes all or any of the elements and all combinations of one or more of the associated listed items.

Those skilled in the art will understand that all the terms (including technical and scientific terms) used herein have the same meanings as commonly understood by a person of ordinary skill in the art to which the present application pertains, unless otherwise defined. It will be further understood that terms such as those defined in commonly used dictionaries should be interpreted as having meanings consistent with their meanings in the context of the prior art, and will not be explained in an idealized or too formal sense, unless specifically defined herein.

Those skilled in the art will understand that "terminal" and "terminal device" used herein include not only a device of a wireless signal receiver, which is a device having a wireless signal receiver without transmitting capability, but also a device including receiving and transmitting hardware, which has receiving and transmitting hardware capable of performing two-way communication on a two-way communication link. The device can include a cellular device or other communication devices with single line or multiple-line displays or without multiple-line displays: a Personal Communications Service (PCS) with combined voice, data processing, fax and/or data communication capabilities; a Personal Digital Assistant (PDA) which can include a radio frequency receiver, a pager, Internet/intranet access, a network explorer, a notepad, a calendar and/or a Global Positioning System (GPS) receiver; and a normal laptop and/or a palmtop computer or other devices having and/or including a radio frequency receiver. The "terminal" and "terminal device" used herein can be portable, transportable, or installable to vehicle (aviation, shipping and/or land), or suitable and/or configured to operate locally, and/or operate in a distributed fashion on any other location on Earth and/or space. The "terminal" and "terminal device" used herein can also be a communication terminal, an Internet access terminal, a music/video play terminal such as a PDA, a Mobile Internet Device (MID) and/or mobile phone with a music/video playback function, or a smart TV, a top box and the like.

Those skilled in the art will understand that a remote network device used herein includes but not limited to a cloud which consists of a computer, a network host, a single network server, multiple network server sets or multiple servers. Herein, the cloud consists of a mass of computers or network servers based on Cloud Computing, where, the Cloud Computing is one kind of distributed computing, and the cloud is a virtual supercomputer which consists of a group of loosely coupled computer sets. In embodiments of the present application, a remote network device, a terminal device, and a wireless network system (WNS) server can communicate with each other by any communication means, including but not limited to: mobile communication based on 3rd Generation Partnership Project (3GPP), Long Term Evolution (LTE) or World interoperability for Microwave Access (WIMAX); computer network communication based on Transmission Control Protocol/Internet Protocol (TCP/IP) and User Datagram Protocol (UDP); and near field wireless transmission based on Bluetooth or an infrared transmission standard.

Figure 1:
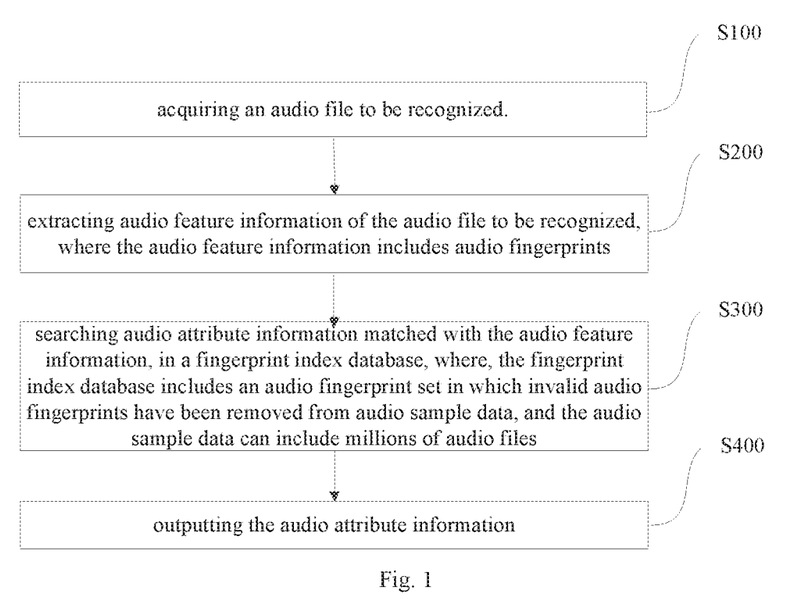
FIG. 1 is a flowchart of an audio recognition method according to an embodiment.

FIG. 1 is a flowchart of steps S100-400 of an audio recognition method according to an embodiment.

The present application provides the audio recognition method, including:

Step S100: acquiring an audio file to be recognized.

The audio file to be recognized can be an audio segment in a movie, an audio segment in a TV series, an audio segment in a TV program, a music segment played by a music station, or audio data sent by a person, such as humming music and song segments. If a user wants to know information of the audio file to be recognized, such as the music style of a music file, the type of animal calls in an audio file, and the type of a language spoken by a speaker, an audio recognition request can be initiated. In this step, when the audio recognition request sent by the user is received, the audio file to be recognized is acquired.

The process of acquiring the audio file to be recognized can include the following two implementations: in the first implementation, when the audio recognition request sent by the user is received, a recording function can be activated to record an audio file in real time, and the audio file recorded in real time is the audio file to be recognized; in the second implementation, when the audio recognition request sent by the user is received, the audio file to be recognized that is requested to be recognized by the user can be received, and the user can provide the audio file to be recognized by uploading.

Step S200: extracting audio feature information of the audio file to be recognized, where the audio feature information includes audio fingerprints.

The audio fingerprints of the audio file can reflect identification information of important acoustic features of the audio file. The audio fingerprints of the audio file require perceptual similarity or content similarity, having basic features such as distinguishability, robustness, and granularity; where, the distinguishability means that audio fingerprints of different audio files should have a large difference, and there should be a small difference between audio fingerprints of an original record and audio fingerprints of a distorted record of a same audio file; the robustness means that an audio file can still be recognized after undergoing various audio format conversions, channel noise interference, and other processing; and the granularity means that even a short audio file can be successfully recognized, where the short audio file is an audio file with a smaller length, such as an audio file with a length of 5 seconds to 10 seconds. In addition, audio fingerprints of an audio file have more features in various application scenarios, for example: in a terminal application scenario, audio fingerprints of an audio file should be easy to calculate, and fast and real-time audio fingerprint calculation can be realized in a terminal with limited computing resources; for another example: in a wireless network application scenario, audio fingerprints of an audio file require a small amount of data to adapt to wireless network transmission.

The audio fingerprints are composed of local maximum points, that is, peak points in a frequency domain. For example, time-frequency analysis based on short-time Fourier transform can be performed on an audio file to generate multiple phase channels, and each phase channel corresponds to a time-frequency sub-picture; then at least one local maximum point, that is, a peak point, of each phase channel from these phase channels is extracted, and at least one peak feature point, that is, a peak point, of each phase channel constitutes a peak feature point sequence of each phase channel; and the peak feature point sequence of each phase channel is processed, such as a hash operation, to acquire each fingerprint sequence of the corresponding phase channel, and then these fingerprint sequences together form the audio fingerprints.

Here, the audio feature information is feature information used to reflect the audio file to be recognized, and the audio feature information can include audio fingerprints that reflect identification information of the audio file to be recognized. It can also be audio fingerprints of the identification information of the audio file to be recognized.

Step S300: searching audio attribute information matched with the audio feature information, in a fingerprint index database, where the fingerprint index database includes an audio fingerprint set in which invalid audio fingerprints have been removed from audio sample data, and the audio sample data can include millions of audio files.

Audio attribute data, which is also the audio attribute information, is data describing audio attributes. For example, if an audio file to be recognized is music, the attribute data can be a music style, such as, pop, rock, classical or jazz, etc., and can even be detailed to a singer, a music name, etc.; if an audio file to be recognized is a piece of audio about animal calls, the audio attribute data can be an animal type of the animal calls in the audio; if an audio file to be recognized is a piece of audio about a person speaking, the audio attribute data can be a type of a language in the audio, such as Chinese, English and Japanese, etc. That is, the audio attribute information matched with the audio feature information includes at least one of the following: a song style, a natural sound in an audio, and a language of a speaker in an audio, natural sounds in an audio can be character calls, animal calls, wind sounds, thunder, rain sounds, collision sounds, etc.

Therefore, if a language of a speaker in an audio can be recognized, the above audio recognition method can be considered to recognize a language, such as a language type or contents of a language. In this way, the method can be applied to a translation tool, for example, contents of a language are recognized and corresponding texts are translated at the same time. Then, the audio attribute information can include a language of an audio speaker and corresponding translated text information.

The fingerprint index database can store the correspondence between the audio fingerprints and the audio attribute information. Therefore, after extracting the audio feature information of the audio file to be recognized, the audio attribute information matched with the audio feature information can be searched in the fingerprint index database. If the audio feature information is the audio fingerprints, the audio attribute information matched with the audio fingerprints can be searched in the fingerprint index database; if the audio feature information includes other feature information in addition to the audio fingerprints, the audio attribute information matched with the audio fingerprints included in the audio feature information can be used as audio attribute information matched with the audio feature information.

For example, assuming that audio feature information of an audio file to be recognized is audio fingerprints A, audio attribute information matched with audio fingerprints A can be searched in a fingerprint index database. Assuming that audio feature information of the audio file to be recognized includes feature information B in addition to audio fingerprints A, audio attribute information matched with audio fingerprints A can be searched in a fingerprint index database. The audio attribute information searched and matched with audio fingerprints A is audio attribute information C, and then the audio attribute information C is the audio attribute information matched with the audio feature information of the audio file to be recognized.

In some embodiments, the audio recognition method can further include step S400: outputting the audio attribute information. For example, outputting music information such as a singer and song name of a recognized music to a user; outputting a recognized animal call to a user, then, the audio recognition method can be used for field animal research; outputting recognized wind, thunder, and rain sounds to a user, then, the audio recognition method can be used for meteorological research; and outputting a recognized language type or contents of a language to a user, then, the audio recognition method can be used for language translation.

Figure 2:
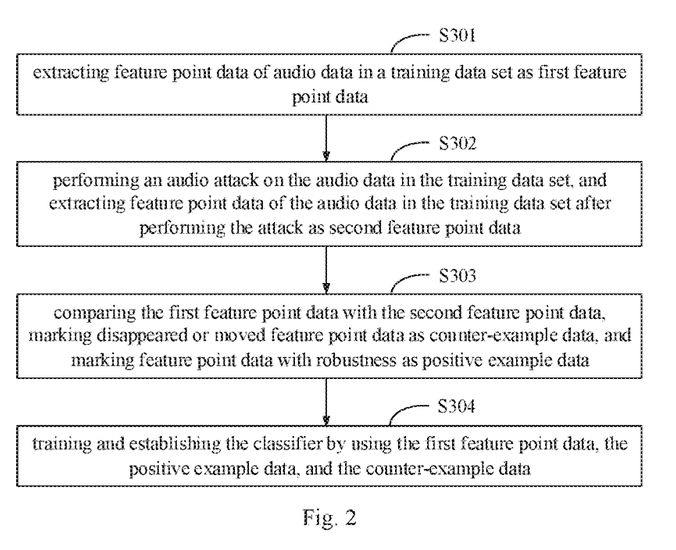
FIG. 2 is a process diagram of establishment of a classifier according to an embodiment.

In some embodiments, a classifier can be used to perform removal on invalid audio fingerprint from audio sample data, and the classifier can be established through the following steps S301 to S304. FIG. 2 is a process diagram of establishment of a classifier according to an embodiment.

S301: extracting feature point data of audio data in a training data set as first feature point data.

The audio data in the training data set is various audio data collected in advance. Taking music style recognition as an example, songs of various music styles can be collected in advance, such as pop, rock, classical and jazz, etc. Multiple training data will be collected for each style and will be marked, that is, which music style the song corresponds to will be marked. In order to ensure better recognition results, the amount of training data should be as much as possible, such as more than 10,000 audio files of each type.

After samples are collected, the feature point data can be extracted from the samples in the training data set, and the extracted feature point data is used as the first feature point data, where the samples are the above various audio data collected in advance. The first feature point data is feature data capable of reflecting audio attributes of the samples, such as dividing each audio file into multiple audio frames, then, the first feature point data can include at least one of the following: energy of an audio frame where the local maximum points are located, energy of a frequency where the local maximum points are located, and a ratio of energy of a frequency where the local maximum points are located to energy of the audio frame where the local maximum points are located, the number of the local maximum points in the audio frame, energy of an audio frame near the audio frame where the local maximum points are located in time dimension, or energy distribution of points around the local maximum points.

S302: performing an audio attack on the audio data in the training data set, and extracting feature point data of the audio data in the training data set after performing the attack as second feature point data.

The audio attack includes data processing on an audio file, and the data processing includes at least one of the following types: segmentation, conversion of audio encoding formats, sampling rate conversion, noising processing according to different signal-to-noise ratios and noise types, ova dubbing, or non-ova dubbing. In general, only a single type of audio attack is used. Except "segmentation", each audio attack will cause a certain degradation in sound quality. If a combination attack is performed, it can cause a serious degradation in audio quality; then, it is meaningless to extract audio fingerprints. When using the combination attack, only the combination of "conversion of audio encoding formats" and "sampling rate conversion" is used. Each of these two types of audio attacks has multiple, such as dozens of, optional parameters, and there are hundreds of possible combinations.

After performing the audio attack, the feature point data extracted from the audio data after performing the audio attack is used as the second feature point data. Similar to the first feature point data, the second feature point data is feature data capable of reflecting audio attributes of a sample after performing an audio attack, such as dividing each audio file into multiple audio frames. Then, the second feature point data can include at least one of the following: energy of an audio frame where the local maximum points are located, energy of a frequency where the local maximum points are located, and a ratio of energy of a frequency where the local maximum points are located to energy of the audio frame where the local maximum points are located, the number of the local maximum points in the audio frame, energy of an audio frame near the audio frame where the local maximum points are located in time dimension, or energy distribution of points around the local maximum points.

S303: comparing the first feature point data with the second feature point data, marking disappeared or moved feature point data as counter-example data, and marking feature point data with robustness as positive example data.

For example, comparing the first feature point data with the second feature point data, if some data in the first feature point data does not exist in the second feature point data, then the data is disappeared feature point data for another example, a local maximum point in the first feature point data was originally located at the position (1.10 seconds, 200 Hz), however, after performing a codec conversion, that is, an audio attack, the local maximum point does not appear at the original position, but appears at the position (1.11 seconds, 200 Hz), which becomes the second feature point data. That is to say, it is translated by 0.01 seconds in the time dimension. Then, the moved local maximum point, which is the moved feature point data, can be marked as counter-example data. The feature point data still with robustness or no movement is positive example data.

S304: training and establishing the classifier by using the first feature point data, the positive example data, and the counter-example data. In some embodiments, an algorithm for training and establishing the classifier by using the first feature point data, the positive example data, and the counter-example includes at least one of the following: an Support Vector Machine, SVM, algorithm, a Nearest Neighbor algorithm, also known as a K-nearest neighbor algorithm, a neural network algorithm, and so on.

Taking the training of the classifier by using the neural network as an example, the training process can include: first, constructing an initial classifier, and then inputting the first feature point data into the initial classifier, where the initial classifier can output a result, that is, positive data or counter-example data, corresponding to the first feature point data. If the result output by the initial classifier is the same as the marked result of the first feature point data, it indicates that the classification of the first feature point data by the initial classifier is accurate at this time, and then the next first feature point data can be input continuously for training.

If the result output by the initial classifier is different from the marked result of the first feature point data, it indicates that the classification of the first feature point data by the initial classifier is inaccurate at this time, parameters of the initial classifier can be adjusted to make a result output by the initial classifier more accurate, and then the next first feature point data can be input continuously for training.

According to the above method, the initial classifier is trained iteratively, and its parameters are adjusted until the number of iterations reaches a preset number, or until the accuracy of a result output by the initial classifier reaches a preset value, it indicates that the initial classifier can meet the needs of classification accuracy at this time and can output accurate results, and then the training can be stopped to acquire the above classifier.

After a classifier is established, the classifier is used to filter the above audio sample data, and the feature point data determined as counter-example data is removed as invalid audio fingerprints. At the same time, invalid audio fingerprints derived from the feature point data determined as the counter-example data can be removed. Then, the above fingerprint index database can be formed according to an audio fingerprint set of audio sample data after invalid audio fingerprints are removed. Removing invalid fingerprints can reduce the number of audio fingerprints in the fingerprint index database and improve the efficiency of audio recognition.

where, audio sample data can be audio data acquired in advance, and can include audio data in the training data set described above, or may not include audio data in the training data set described above, which are all reasonable.

In one implementation mode, the classifier filters the audio sample data, and removes feature point data, determined as counter-example data, as invalid audio fingerprints, and the steps can include:

Step a, extracting feature point data of the audio sample data.

After acquiring the audio sample data, in order to classify its audio fingerprints, feature point data extraction can be performed on the audio sample data. The feature point data can be feature data capable of reflecting audio attributes of the audio sample data, such as dividing each audio sample data into multiple audio frames, then, the feature point data can include at least one of the following: energy of an audio frame where the local maximum points are located, energy of a frequency where the local maximum points are located, and a ratio of energy of a frequency where the local maximum points are located to energy of the audio frame where the local maximum points are located, the number of the local maximum points in the audio frame, energy of an audio frame near the audio frame where the local maximum points are located in time dimension, or energy distribution of points around the local maximum points.

Step b, inputting the extracted feature point data into the classifier.

After feature point data of the audio sample data is extracted, the extracted feature point data can be input into the classifier. The classifier can classify the input feature point data, determine whether it is positive example data or counter-example data, and output a corresponding result.

Step c, according to the result of positive example data or counter-example data output by the classifier, removing feature point data, determined as counter-example data, as invalid audio fingerprints.

Since the trained classifier can already accurately distinguish feature point data as positive example data or counter-example data, a result of the positive example data or counter-example data output by the classifier can indicate a type of audio fingerprints of the corresponding audio sample data.

Specifically, if a result output by the classifier is positive example data, it indicates that feature point data of the audio sample data can be used as valid audio fingerprints, and then the feature point data can be retained. If a result output by the classifier is counter-example data, it indicates that feature point data of the audio sample data can be used as invalid audio fingerprints, which needn't be retained, and the feature point data can be removed.

In this way, after all the audio sample data is filtered by the classifier, retained feature point data can be used as audio fingerprints and stored in correspondence with the audio attribute information of the audio sample data, to acquire the above fingerprint index database.

Figure 3:
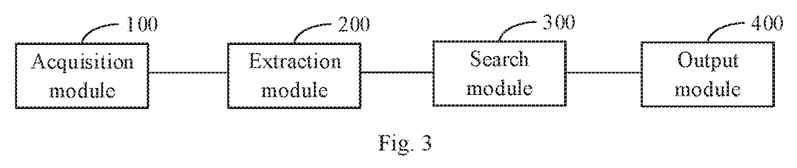
FIG. 3 is a block diagram of an audio recognition device according to an embodiment.

Corresponding to the above audio recognition method, the present application further provides an audio recognition device, which includes: an acquisition module 100, an extraction module 200, and a search module 300. FIG. 3 is a block diagram of an audio recognition device according to an embodiment.

The acquisition module 100 is used for acquiring an audio file to be recognized; the extraction module 200 is used for extracting audio feature information of the audio file to be recognized, where the audio feature information includes audio fingerprints; and the search module 300 is used for searching audio attribute information matched with the audio feature information, in a fingerprint index database, where, the fingerprint index database includes an audio fingerprint set in which invalid audio fingerprints have been removed from audio sample data.

The acquisition module 100 acquires the audio file to be recognized.

The audio file to be recognized can be an audio segment in a movie, an audio segment in a TV series, an audio segment in a TV program, a music segment played by a music station, or audio data sent by a person, such as humming music and song segments. If a user wants to know the information of the audio file to be recognized, such as the music style of a music file, the type of animal calls in an audio file, and the type of a language spoken by a speaker, an audio recognition request can be initiated. When the audio recognition request sent by the user is received, the acquisition module 100 acquires the audio file to be recognized.

The process of acquiring the audio file to be recognized can include the following two implementations: in the first implementation, when the audio recognition request sent by the user is received, the acquisition module 100 can activate a recording function to record an audio file in real time, and the audio file recorded in real time is the audio file to be recognized; in the second implementation, when the audio recognition request sent by the user is received, the acquisition module 100 can receive the audio file to be recognized that is requested to be recognized by the user, and the user can provide the audio file to be recognized by uploading.

The extraction module 200 extracts audio feature information of the audio file to be recognized, where the audio feature information includes audio fingerprints;

The audio fingerprints of the audio file can reflect identification information of important acoustic features of the audio file. The audio fingerprints of the audio file require perceptual similarity or content similarity, having basic features such as distinguishability, robustness, and granularity; where, the distinguishability means that similarity fingerprints of different audio files should have a large difference, and there should be a small difference between similarity fingerprints of an original record and similarity fingerprints of a distorted record of a same audio file; the robustness means that an audio file can still be recognized after undergoing various audio format conversions, channel noise interference, and other processing; and the granularity means that even a short audio file can be successfully recognized, where the short audio file is an audio file with a smaller length, for example, an audio file with a length of 5 seconds to 10 seconds can also be successfully recognized. In addition, audio fingerprints of an audio file have more features in various application scenarios, for example: in a terminal application scenario, audio fingerprints of an audio file should be easy to calculate, and fast and real-time audio fingerprints calculation can be realized in a terminal with limited computing resources; for another example: in a wireless network application scenario, audio fingerprints of an audio file require a small amount of data to adapt to wireless network transmission.

The audio fingerprints are composed of local maximum points, that is, peak points in a frequency domain. For example, time-frequency analysis based on short-time Fourier transform can be performed on an audio file to generate multiple phase channels, and each phase channel corresponds to a time-frequency sub-picture; then at least one local maximum point, that is, a peak point, of each phase channel from these phase channels is extracted and at least one peak feature point of each phase channel constitutes a peak feature point sequence of each phase channel; and the peak feature point sequence of each phase channel is processed, such as a hash operation, to acquire each fingerprint sequence of the corresponding phase channel, and then these fingerprint sequences together form the audio fingerprints.

Here, the audio feature information is feature information used to reflect the audio file to be recognized, and the audio feature information can include audio fingerprints that reflect identification information of the audio file to be recognized. It can also be audio fingerprints of the identification information of the audio file to be recognized.

The search module 300 searches audio attribute information matched with the audio feature information, in a fingerprint index database, where, the fingerprint index database includes an audio fingerprint set in which invalid audio fingerprints have been removed from audio sample data, and audio sample data may include millions of audio files.

Audio attribute data, which is also the audio attribute information, is data describing audio attributes. For example, if an audio file to be recognized is music, the attribute data can be a music style, such as, pop, rock, classical or jazz etc., and can even be detailed to a singer, a music name, etc.; if an audio file to be recognized is a piece of audio about animal calls, the attribute data may be an animal type of the animal calls in the audio; if the audio file to be recognized is a piece of audio about a person speaking, the attribute data may be a type of a language in the audio, such as Chinese, English and. Japanese, etc. That is, the audio attribute information matched with the audio feature information includes at least one of the following: a song style, a natural sound in an audio, and a language of a speaker in an audio, natural sounds in an audio can be character calls, animal calls, wind sounds, thunder, rain sounds, collision sounds, etc.

Therefore, if a language of a speaker in an audio can be recognized, the above audio recognition method can be considered to recognize a language, such as a language type or contents of a language. In this way, the device can be applied to a translation tool, for example, contents of a language are recognized and corresponding texts are translated at the same time. Then, the audio attribute information can include a language of an audio speaker and corresponding translated text information.

In some embodiments, the audio recognition device can further include an output module 400 for outputting the audio attribute information. For example, the output module 400 outputs music information such as a singer and song name of a recognized music to a user; outputs a recognized animal call to a user, then, the audio recognition method can be used for field animal research; outputs recognized wind, thunder, and rain sounds to a user, then, the audio recognition method can be used for meteorological research; and outputs a recognized language type or contents of a language to a user, then, the audio recognition method can be used for language translation.

In some embodiments, a classifier can be used to perform removal on invalid audio fingerprint from on audio sample data, and the classifier can be established through the following steps S301 to S304, see FIG. 2.

S301: extracting feature point data of audio data in a training data set as first feature point data.

The audio data in the training data set is various audio data collected in advance. Taking music style recognition as an example, songs of various music styles can be collected in advance, such as pop, rock, classical and jazz, etc. Multiple training data will be collected for each style and will be marked, that is, which music style the song corresponds to will be marked. In order to ensure better recognition results, the amount of training data should be as much as possible, such as more than 10,000 audio files of each type.

After samples are collected, the feature point data can be extracted from the samples in the training data set, and the extracted feature point data is used as the first feature point data, where the samples are the above various audio data collected in advance. The first feature point data is feature data capable of reflecting audio attributes of the samples, such as dividing each audio file into multiple audio frames, then, the first feature point data can include at least one of the following: energy of an audio frame where the local maximum points are located, energy of a frequency where the local maximum points are located, and a ratio of energy of a frequency where the local maximum points are located to energy of the audio frame where the local maximum points are located, the number of local maximum points in the audio frame, energy of an audio frame near the audio frame where the local maximum points are located in time dimension, or energy distribution of points around the local maximum points.

S302: performing an audio attack on the audio data in the training data set, and extracting feature point data of the audio data in the training data set after performing the attack as second feature point data.

The audio attack includes data processing on an audio file, and the data processing includes at least one of the following types: segmentation, conversion of audio encoding formats, sampling rate conversion, noising processing according to different signal-to-noise ratios and noise types, ova dubbing, or non-ova dubbing. In general, only a single type of audio attack is used. Except "segmentation", each audio attack will cause a certain degradation in sound quality. If a combination attack is performed, it can cause a serious degradation in audio quality; then, it is meaningless to extract audio fingerprints. When using the combination attack, only the combination of "conversion of audio encoding formats" and "sampling rate conversion" is used. Each of these two types of audio attacks has multiple, such as dozens of, optional parameters, and there are hundreds of possible combinations.

After performing the audio attack, the feature point data is extracted from the audio data after performing the audio attack as the second feature point data. Similar to the first feature point data, the second feature point data is feature data capable of reflecting audio attributes of a sample after performing an audio attack, such as dividing each audio file into multiple audio frames. Then, the second feature point data can include at least one of the following: energy of an audio frame where the local maximum points are located, energy of a frequency where the local maximum points are located, and a ratio of energy of a frequency where the local maximum points are located to energy of the audio frame where the local maximum points are located, the number of the local maximum points in the audio frame, energy of an audio frame near the audio frame where the local maximum points are located in time dimension, or energy distribution of points around the local maximum points.

S303: comparing the first feature point data with the second feature point data, marking disappeared or moved feature point data as counter-example data, and marking feature point data with robustness as positive example data. For example, comparing the first feature point data with the second feature point data, if some data in the first feature point data does not exist in the second feature point data, then the data is disappeared feature point data; for another example, a local maximum point in the first feature point data was originally located at the position (1.10 seconds, 200 Hz), however, after performing a codec conversion, that is, an audio attack, the local maximum point does not appear at the original position, but appears at the position (1.11 seconds, 200 Hz), which becomes the second feature point data. That is to say, it is translated by 0.01 seconds in the time dimension. Then, the moved local maximum point, which is the moved feature point data, can be marked as counter-example data. The feature point data still with robustness or no movement is positive example data.

S304: training and establishing the classifier by using the first feature point data, the positive example data, and the counter-example data. In some embodiments, an algorithm for training and establishing the classifier by using the first feature point data, the positive example data, and the counter-example includes at least one of the following: an SVM algorithm, a Nearest Neighbor algorithm, also known as a K-nearest neighbor algorithm, a neural network algorithm, and so on.

After a classifier is established, the classifier filters the above audio sample data, and the feature point data determined as counter-example data is removed as invalid audio fingerprints. At the same time, invalid audio fingerprints derived from the feature point data determined as the counter-example data can be removed. Then, the above fingerprint index database can be formed according to an audio fingerprint set of audio sample data after invalid audio fingerprints are removed. Removing invalid fingerprints can reduce the number of audio fingerprints in the fingerprint index database and improve the efficiency of audio recognition.

In some embodiments, the classifier filters the audio sample data, and removes feature point data, determined as counter-example data, as invalid audio fingerprints, and the steps can include:

extracting feature point data of the audio sample data; inputting the extracted feature point data into the classifier; according to the result of positive example data or counter-example data output by the classifier, removing feature point data, determined as counter-example data, as invalid audio fingerprints.

The present application further provides a server, which includes: one or more processors; a memory; and one or more application programs, where the one or more application programs are stored in the memory and configured to be executed by the one or more processors to perform the audio recognition method of any one of foregoing embodiments.

The present application further provides a computer-readable storage medium, where computer programs stored in the computer-readable storage medium are executed by a processor to perform the audio recognition method of any one of foregoing embodiments.

The present application further provides an application program, where the application program is executed to perform the audio recognition method of any one of foregoing embodiments.

According to the audio recognition method and device, the server and the computer-readable storage medium, when the stored computer programs are executed by the processor and when the application program is running, the audio file to be recognized is acquired; the audio feature information of the audio file to be recognized is extracted, where the audio feature information includes the audio fingerprints; in the fingerprint index database, the audio attribute information matched with the audio feature information is searched, where, the fingerprint index database includes the audio fingerprint set in which invalid audio fingerprints have been removed from the audio sample data. Since the audio fingerprint set in the fingerprint index database is an audio fingerprint set in which the invalid audio fingerprints have been removed from the audio sample data, the storage space of the audio fingerprints in the fingerprint index database can be reduced, and the audio recognition efficiency can be improved.

It should be understood that although steps in flowcharts of the drawings are sequentially displayed in accordance with directions of arrows, these steps are not necessarily performed sequentially in an order indicated by the arrows. Unless explicitly stated herein, the performing of these steps is not strictly limited in an order, and the steps can be performed in other orders. Moreover, at least a part of the steps in the flowcharts of the drawings can include multiple sub-steps or multiple stages. These sub-steps or stages are not necessarily performed at the same time, but can be performed at different times, and the performing order thereof is not necessarily sequential, but can be performed in turn or alternately with at least a part of another steps or sub-steps or stages of another steps.

What have been described above are only part of implementations of the present application. It is to be noted that those of ordinary skilled in the art can also make some improvements and embellishments without departing from the principle of the present application. These improvements and embellishments should also be regarded as falling within the scope of protection of the present application.

The invention claimed is:

1. An audio recognition method, comprising:
acquiring an audio file to be recognized;
extracting audio fingerprints of the audio file to be recognized; and
searching audio attribute information matched with the audio fingerprints, in a fingerprint index database;
wherein, the fingerprint index database comprises first audio fingerprints corresponding to audio samples; the first audio fingerprints are audio fingerprints in which invalid audio fingerprints have been removed from the audio samples by a classifier; and each of the audio samples has corresponding audio attribute information;
wherein the classifier is established through following operations:
extracting feature point data of audio data in a training data set as first feature point data;
performing an audio attack on the audio data in the training data set, and extracting feature point data of audio data in the training data set after performing the audio attack as second feature point data;
comparing the first feature point data with the second feature point data, marking disappeared or moved feature point data as counter-example data, and marking feature point data with robustness as positive example data; and
training and establishing the classifier by using the first feature point data, the positive example data, and the counter-example data;
wherein the classifier filters the audio samples, and removes feature point data, determined as counter-example data, as invalid audio fingerprints;
wherein an operation that the classifier filters the audio samples, and removes the feature point data, determined as the counter-example data, as the invalid audio fingerprints, comprises:
extracting feature point data of the audio samples;
inputting the extracted feature point data into the classifier; and
removing the feature point data, determined as the counter-example data, as the invalid audio fingerprints, according to a result of positive example data or counter-example data output by the classifier.

2. The audio recognition method according to claim 1, wherein an algorithm for training and establishing the classifier by using the first feature point data, the positive example data, and the counter-example comprises at least one of the following:
a nearest neighbor algorithm, a support vector machine algorithm or a neural network algorithm.

3. The audio recognition method according to claim 1, wherein feature point data comprises at least one of the following:
energy of an audio frame where a local maximum point is located;
energy of a frequency where the local maximum point is located, and a ratio of energy of the frequency where the local maximum point is located to energy of the audio frame where the local maximum point is located;

a quantity of local maximum points in the audio frame;
energy of an audio frame near the audio frame where the local maximum point is located in time dimension; or
energy distribution of points around a local maximum point.

4. The audio recognition method according to claim 1, wherein the audio attack comprises data processing on the audio data, and the data processing comprises at least one of the following:
segmentation, conversion of audio encoding formats, sampling rate conversion, noising processing according to different signal-to-noise ratios and noise types, over-the-air (ova) dubbing or non-ova dubbing.

5. The audio recognition method according to claim 1, wherein the audio attribute information matched with the audio feature information comprises at least one of the following:
a song style, a natural sound in an audio or a language of a speaker in an audio.

6. The audio recognition method according to claim 4, wherein under a condition that the audio attribute information comprises the language of the speaker in an audio, the audio attribute information further comprises translated text information corresponding to the language of the speaker in the audio.

7. The audio recognition method according to claim 1, further comprising:
outputting the audio attribute information.

8. An audio recognition device, comprising:
one or more processors;
a memory; and
one or more application programs, wherein the one or more application programs are stored in the memory and configured to be executed by the one or more processors to:
acquire an audio file to be recognized;
extract audio fingerprints of the audio file to be recognized; and
search audio attribute information matched with the audio fingerprints, in a fingerprint index database;
wherein, the fingerprint index database comprises first audio fingerprints corresponding to audio samples; the first audio fingerprints are audio fingerprints in which invalid audio fingerprints have been removed from the audio samples by a classifier; and each of the audio samples has corresponding audio attribute information;
wherein the classifier is established through following operations:
extracting feature point data of audio data in a training data set as first feature point data;
performing an audio attack on the audio data in the training data set, and extracting feature point data of audio data in the training data set after performing the audio attack as second feature point data;
comparing the first feature point data with the second feature point data, marking disappeared or moved feature point data as counter-example data, and marking feature point data with robustness as positive example data; and
training and establishing the classifier by using the first feature point data, the positive example data, and the counter-example data;
wherein the classifier filters the audio sample data, and removes feature point data, determined as counter-example data, as invalid audio fingerprints;
wherein an operation that the classifier filters the audio sample data, and removes the feature point data, determined as the counter-example data, as the invalid audio fingerprints, comprises:
extracting feature point data of the audio sample data;
inputting the extracted feature point data into the classifier; and
removing the feature point data, determined as the counter-example data, as the invalid audio fingerprints, according to a result of positive example data or counter-example data output by the classifier.

9. The audio recognition device according to claim 8, wherein an algorithm for training and establishing the classifier by using the first feature point data, the positive example data, and the counter-example comprises at least one of the following:
a nearest neighbor algorithm, a support vector machine algorithm or a neural network algorithm.

10. A server, comprising:
one or more processors;
a memory; and
one or more application programs, wherein the one or more application programs are stored in the memory and configured to be executed by the one or more processors to perform the audio recognition method of claim 1.

11. A non-transitory computer-readable storage medium, wherein computer programs stored in the storage medium are executed by a processor to perform the audio recognition method of claim 1.

* * * * *